L. JANISCH & W. LINKE.
SYSTEM OF MOTOR CONTROL.
APPLICATION FILED MAY 7, 1909.

1,003,464.

Patented Sept. 19, 1911.

Witnesses:
J. Earl Ryan
J. Ellis Glen

Inventors:
Leopold Janisch,
Willy Linke,
by Albert H. Davis
Att'y.

UNITED STATES PATENT OFFICE.

LEOPOLD JANISCH AND WILLY LINKE, OF BERLIN, GERMANY, ASSIGNORS TO GENERAL ELECTRIC COMPANY, A CORPORATION OF NEW YORK.

SYSTEM OF MOTOR CONTROL.

1,003,464. Specification of Letters Patent. Patented Sept. 19, 1911.

Application filed May 7, 1909. Serial No. 494,578.

*To all whom it may concern:*

Be it known that we, LEOPOLD JANISCH and WILLY LINKE, subjects of the Emperor of Germany, residing at Berlin, Germany, have invented certain new and useful Improvements in Systems of Motor Control, of which the following is a specification.

Our invention relates to systems of motor control and more particularly to such a system in which the motor, when the load becomes excessive, will remain stationary without being injured, and will automatically start up again when the load is decreased. Such a system is particularly advantageous when the motor drives an anchor windlass, or the like.

Our invention consists in the combination with a motor, of a generator supplying current thereto, and means driven by the motor for automatically weakening the field of said generator upon a decrease in speed of said motor.

Other features of novelty which characterize our invention are pointed out with particularity in the claims annexed to and forming a part of this specification. For a better understanding of our invention, however, reference may be had to the following description taken in connection with the accompanying drawing, in which—

Figure 1:
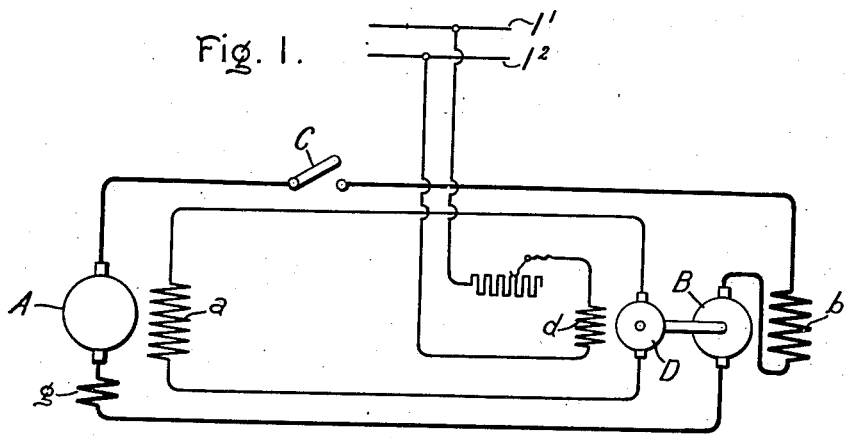
Figure 2:
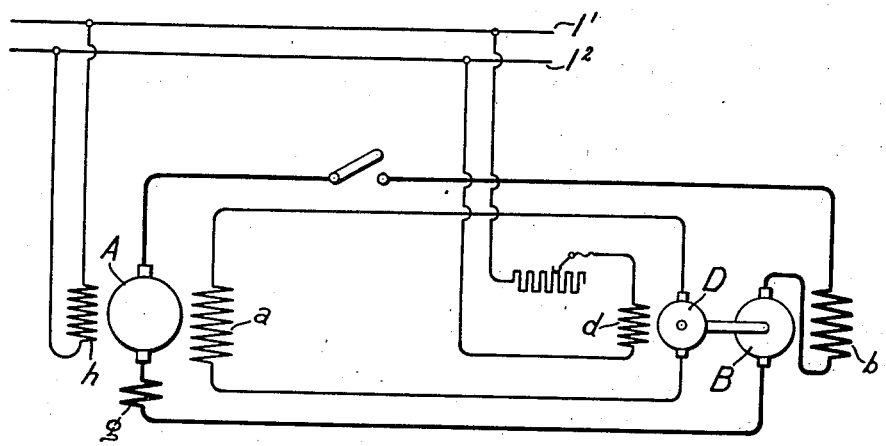

Figure 1 is a diagrammatical representation of a control system in accordance with our invention; and Fig. 2 shows a modification of our system.

In the figures of the drawing, A is the armature of a generator having a separately-excited field winding $a$, and a commutating field winding $g$.

B is the armature and $b$ is the series field winding of a motor connected to the armature of the generator through a switch C.

D represents the armature of a separate exciter which we have chosen to illustrate as being direct-connected to the armature B of the motor, but which may be mechanically driven by the motor in any suitable manner. The field winding $d$ of the exciter is separately-excited from the lines $l^1$ and $l^2$ and is arranged to receive a constant excitation.

The operation of our system is as follows: Upon the closing of the switch C, sufficient current is supplied the motor to start it, due to the residual magnetism of the generator field. As the motor starts, the exciter armature D generates voltage because of its revolution and supplies current to the field winding $a$ of the generator. As the motor speeds up, the voltage of the exciter increases and strengthens the field of the generator, until it is saturated. Thus the speed of the motor is increased to a certain value dependent upon the saturation of the field of the generator. If a load is put on the motor, which slows it down, the current supplied the field winding $a$ of the generator is decreased, and if this load is excessive and persists for any length of time, the motor will come to rest, because the voltage generated by the generator armature A is dependent upon the current flowing through the field winding $a$, which in turn is dependent upon the speed of the motor armature B. It will, therefore, be seen that when the speed of the motor falls, the voltage supplied it falls in such a manner that the amount of current supplied by the generator never exceeds a certain value, and the motor when at rest will not receive enough current to injure it.

If the current of the generator, when the motor armature B is stationary, is not sufficient to start the motor, sufficient current may be obtained by shifting the brushes of the generator in a direction opposite to that of the rotation of the generator. In ordinary machines the amount that the brushes may be shifted is limited by the sparking at the brushes. We, therefore, preferably employ a generator having commutating field poles having a winding $g$ thereon. The short circuited current of such generators may be easily regulated by the position of the brushes.

We may also, in control systems built in accordance with our invention, supply the generator with a relatively small field winding which is constantly excited. Fig. 2 shows such a system in which the winding $h$ is constantly excited from the lines $l^1$ and $l^2$. This winding $h$ supplies just enough excitation to cause sufficient current to flow to just start the motor.

Although we have shown the field windings of the machines connected in a particular manner, it is obvious to those skilled in the art that other connections may be employed to obtain the same results, and we aim in the claims, hereto appended, to cover all modifications of our system that do not involve a departure from the spirit and scope of our invention.

What we claim as new and desire to secure by Letters Patent of the United States, is,—

1. In combination, a motor, a generator supplying current thereto, and means driven by said motor for automatically weakening the field of said generator upon a decrease in the speed of said motor whereby upon the occurrence of an overload on said motor it is slowed down.

2. In combination, a motor, a separately-excited generator supplying current thereto, and means for automatically weakening the field of said generator upon a decrease in the speed of said motor whereby upon the occurrence of an overload on said motor it is slowed down.

3. In combination, a motor, a generator having a separately-excited field winding supplying current to said motor, and an exciter mechanically driven by said motor and supplying current to the field winding of said generator.

4. In combination, a motor, an exciter mechanically driven thereby, and a generator having two separately-excited field windings, one of said windings being relatively small and constantly excited and the other being supplied with current by said exciter.

5. In combination, a motor, a generator supplying current thereto and having a separately-excited field winding, and a separately-excited exciter mechanically driven by said motor and supplying current to the separately-excited field winding of said generator.

6. In combination, a motor having a series field winding, a generator supplying current thereto, and means driven by said motor for automatically weakening the field of said generator upon a decrease in the speed of said motor.

7. In combination, a motor having a series field winding, a separately-excited generator supplying current thereto, and means for automatically weakening the field of said generator upon a decrease in the speed of said motor.

8. In combination, a motor having a series field winding, a generator having a separately-excited field winding supplying current to said motor, and an exciter mechanically driven by said motor and supplying current to the field winding of said generator.

9. In combination, a motor having a series field winding, an exciter mechanically driven thereby, and a generator having two separately-excited field windings, one of said windings being relatively small and constantly excited and the other being supplied with current by said exciter.

10. In combination, a motor having a series field winding, a generator supplying current thereto and having a separately-excited field winding, and a separately-excited exciter mechanically driven by said motor and supplying current to the separately-excited field winding of said generator.

In witness whereof, we have hereunto set our hands this 17th day of April, 1909.

LEOPOLD JANISCH.
WILLY LINKE.

Witnesses:
RICHARD NEUMANN,
LIONEL FLEISCHMANN.